Sept. 20, 1932.   W. F. GROENE   1,878,495
AUTOMATIC LATHE
Filed June 11, 1928   4 Sheets-Sheet 1

INVENTOR.
William F. Groene
BY
Allen & Allen
ATTORNEY.

Sept. 20, 1932. W. F. GROENE 1,878,495
AUTOMATIC LATHE
Filed June 11, 1928 4 Sheets-Sheet 3

INVENTOR.
William F. Groene
BY
Allen Allen
ATTORNEY.

Sept. 20, 1932.  W. F. GROENE  1,878,495
AUTOMATIC LATHE
Filed June 11, 1928   4 Sheets-Sheet 4

INVENTOR.
William F. Groene
BY
ATTORNEY.

Patented Sept. 20, 1932

1,878,495

UNITED STATES PATENT OFFICE

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE

AUTOMATIC LATHE

Application filed June 11, 1928. Serial No. 284,473.

My invention relates to automatic lathes, and has as its object the provision of mechanism whereby a lathe of the type in question may be set to provide a variety of spindle speeds for working cuts, which speeds are preferably shifted in and out of operation automatically.

In application for patent Serial No. 128,818, filed August 12, 1926, I have described an automatic lathe in which a carriage for the tools is moved along a bed by means of a splined shaft which, through the agency of a cam drum on the carriage, serves to move the carriage along and move the tools into and out of the work.

In application for patent Serial No. 236,831, filed November 30, 1927, I have described a feed mechanism for the said lathe which acts automatically when set, to shift from rapid traverse to work feed, back to rapid traverse again, and thence to a stop, as applied to the carriage of the lathe.

My present mechanism is an improvement added to the inventions of said two applications, and utilizes a similar automatic shifting mechanism to the second above mentioned application as a preferred means for automatically shifting from one work feed to another, as applied to the spindle of the lathe.

Essentially it is my object to take a step further than any lathe spindle work feed with which I am familiar and provide a feed box and control therefor, in which may be set up two distinct series of work feeds either of which can be employed at will, and either of which can be given the ratio to the main drive that is desired.

It is also my object to provide for a shift from one of the speeds to another without any stoppage of the tool drive shaft, and, as heretofore stated, contemplates preferably an automatic shifting from one speed to another.

In lathes in the past there have been provisions for shifting work speeds during the operation of the machine so as to permit of imparting a proper rate of movement of the spindles, but in such cases as have come to my attention there was always a definite and inflexible series of work speeds which had to be employed. According to my invention, the master gear elements of the several speeds are so arranged that they can be quickly changed, thus modifying in a prearranged fashion the ratio of input to output speed which is furnished during the cutting cycle.

I accomplish my objects by that certain construction and arrangement of parts to be hereinafter more specifically pointed out and claimed.

In the drawings:—

Figure 11 is a face view of one of the discs for carrying the trip dogs, showing the T slot and the means for inserting the dogs.

Figure 12 is a plan view of the starting and stopping levers.

Figure 1:
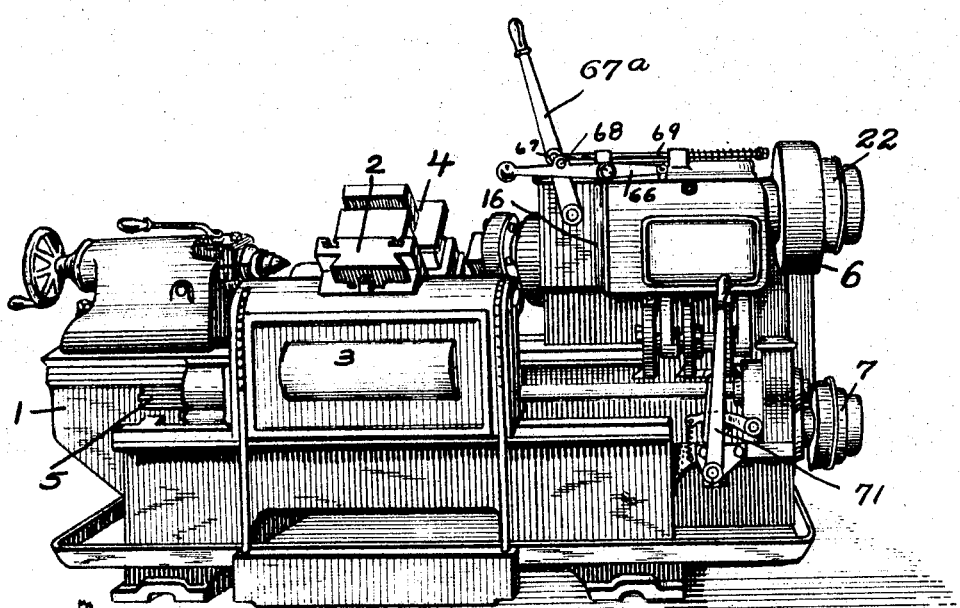
Figure 1 is a rear perspective view of a lathe embodying the invention.

I have shown the machine generally in Figure 1, with a bed 1, and a tool carriage 2. This carriage mounts a cam drum 3, on which are cams (not shown) to move the carriage along the bed, and the tool slide 4 across the carriage. A splined shaft 5 extends along the bed and imparts movement to the cam drum.

The drive of the splined shaft may be provided with power from two sources; the work drive pulley 6, and the rapid traverse drive pulley 7, as described in my former application. There are spindle working speed feed and rapid traverse clutches as will be noted.

My present invention concerns the spindle drive of the lathe.

The timing devices comprise a set of discs 9, mounted on a shaft $9^a$ below the shifting mechanism and actuated by a train of gears terminating in a pinion 10 which engages the internal teeth 11 on one of the discs.

Figure 2:
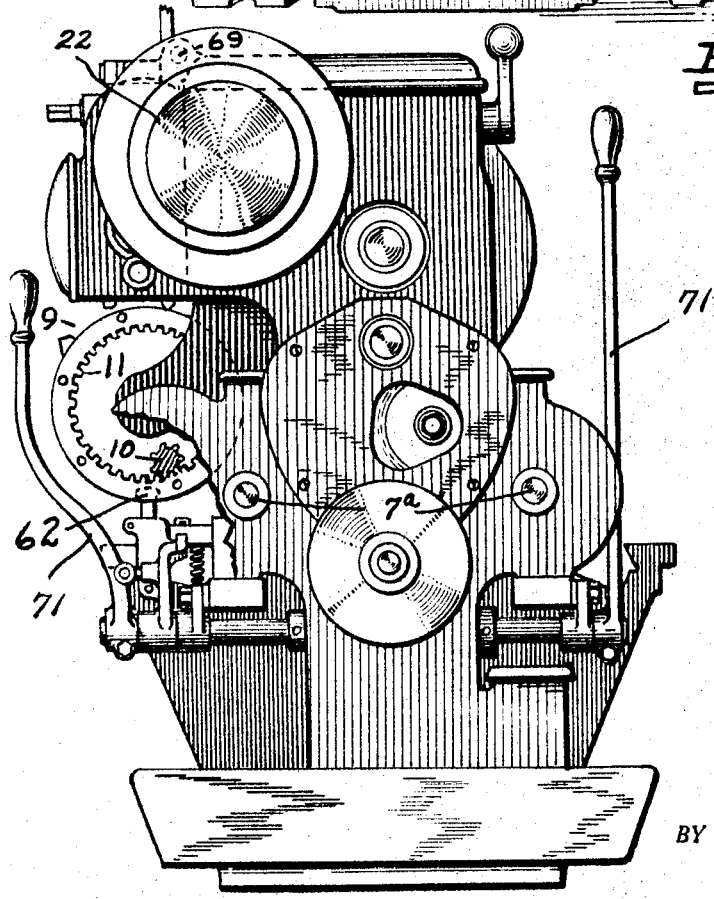
Figure 2 is a head end view of the lathe, with a portion cut away to show the drive for the discs.

The discs (Figs. 2, 3 and 11) have dogs 12, 61 and 64 thereon, which dogs have T bolts 13 therein that engage in grooves 14 near the peripheries of the discs.

Before describing the automatic mechanism for shifting from one gear train to another, I will describe the particular embodiment in my invention whereby I provide for relatively independent trains of work feed gears, each one capable of a setting which will give the desired feed speed. No description is given of the rapid traverse drive, which will be alike to my former application.

Figure 6:
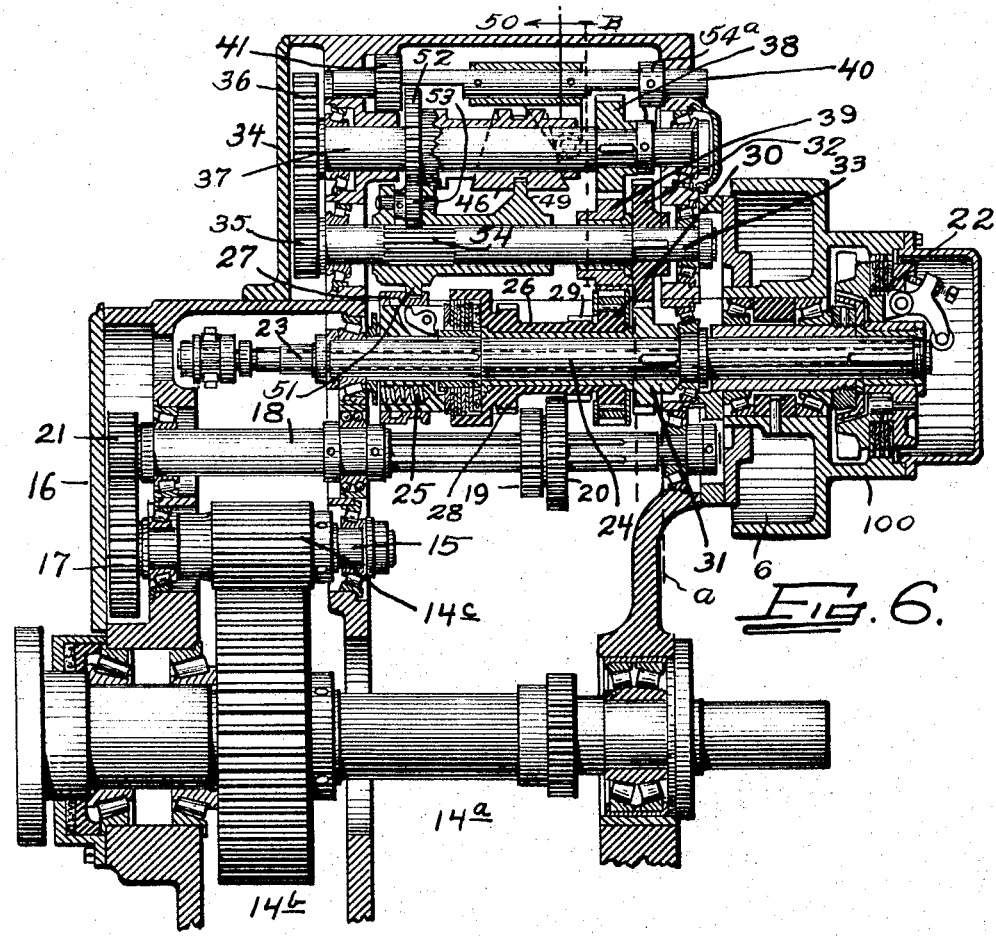
Figure 6 is a sectional diagrammatic view showing the gear trains, with all the various shafts and driving spindle in a common plane for purposes of illustration.
Figure 7:
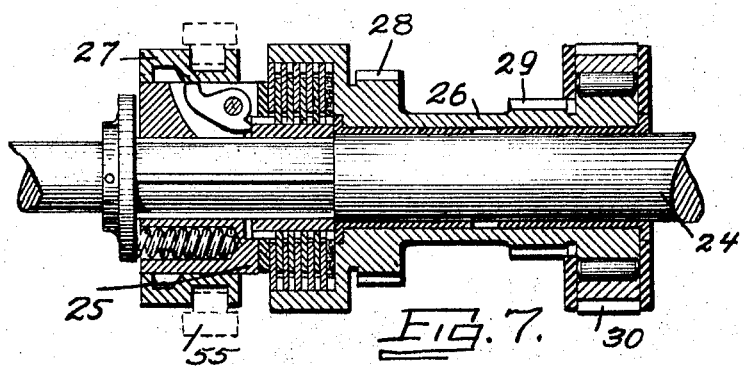
Figure 7 is a sectional view of the high speed clutch in the gear box.

The view shown in Figure 6 is so arranged that the two work feed drives are shown with the parts all in a plane, whereas in fact the upper section of the parts shown in the drawings extend at an angle to the lower part.

Figure 4:
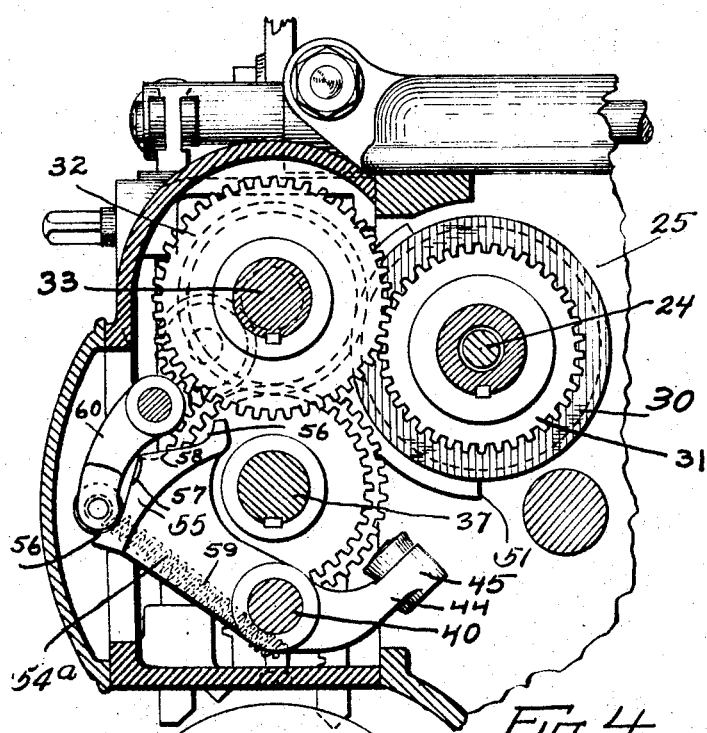
Figure 4 is a sectional view of the gear box and part of the head, taken on line "a" Figure 6.
Figure 5:
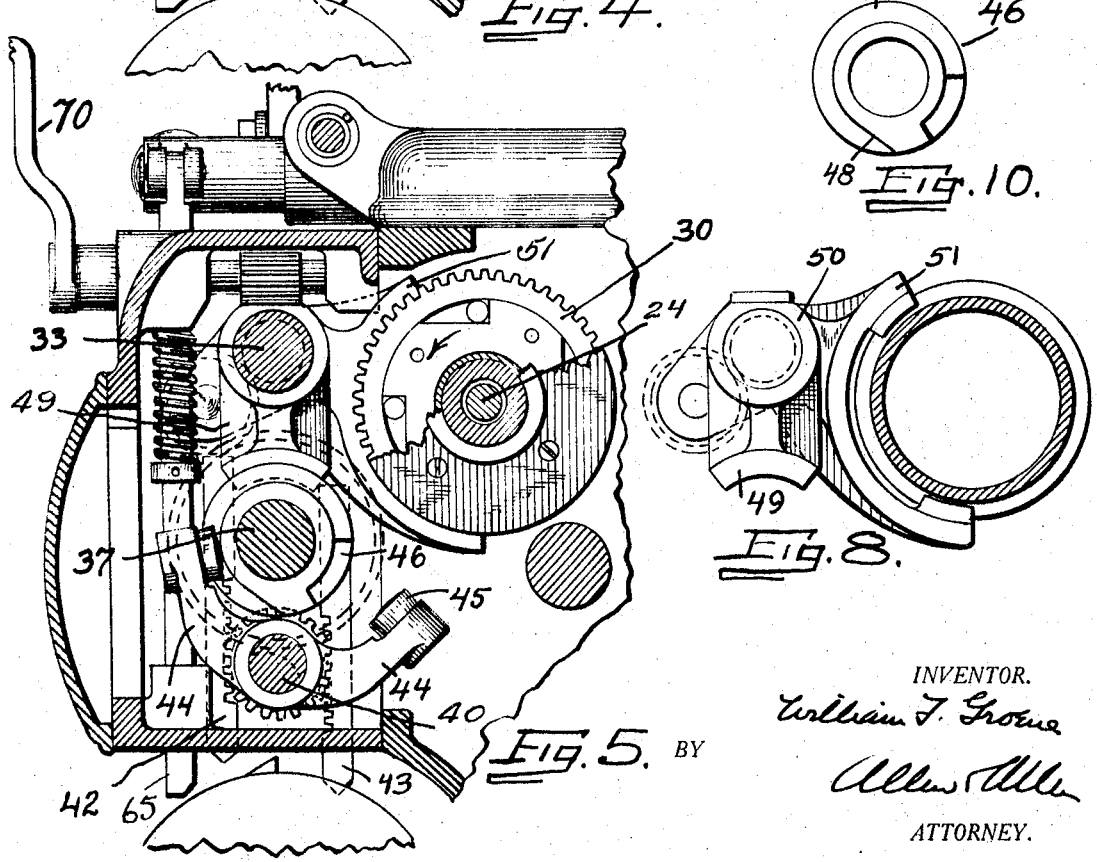
Figure 5 is a sectional view of the gear box taken on line "B" Figure 6.

The proper relation of parts will be understood from reference to Figures 4 and 5, in connection with Figure 6.

The spindle of the lathe is driven by a shaft $14^a$, on which is a gear $14^b$ driven from a pinion $14^c$. The pinion $14^c$ is located on a stub shaft 15, which drives it, and on the outer end of this stub shaft, so as to be exposed by the removal of the plate 16, is a gear 17 located on this stub shaft.

A shaft 18 is mounted across the feed box, which shaft has sliding gears 19 and 20 thereon, whereby this shaft serves as a jack shaft, for shifting from one speed to another from either of the feed drives, as will be noted. The jack shaft has its outer end so placed as to be exposed by removal of the plate 16, and has mounted upon it a gear 21, which meshes with the gear 17 on the stub shaft.

The provision of a series of gears with different numbers of teeth to take the places of the gears 17 and 21, will result in enabling the operator to set up a definite gear ratio between the jack shaft rotation and the spindle rotation, which ratio can be made particularly for one job which is being turned on the lathe with a minimum of effort due to the arrangement of the stub and jack shafts adjacent to the removable cover.

The work drive pulley has a clutch element 22 therein of a type now well known and which is of my invention, which is operated by means of a push rod 23 located within the shaft 24 which serves to support the drive pulley.

On the shaft 24 is a disc clutch 25, of the trigger type, as shown in the drawings, which serves to connect the sleeve 26 to the shaft 24. The clutch is operated by means of a sliding sleeve 27 on the shaft 24, as will be described, the sleeve being grooved for engagement by a suitable fork.

On the sleeve 26 are fixed a pair of gears 28 and 29 which may be alternatively engaged by the gears 19 and 20 on the jack shaft. The sleeve also carries a roller or ball ratchet gear 30, so that its outer periphery can rotate in one direction relatively to the sleeve 26.

Also located on the shaft 24, and fast thereon, is a gear 31 which meshes with a gear 32, fast on a shaft 33, so that whenever the clutch is used to connect the work drive pulley with the shaft 24, the shaft 33 is revolved.

The shaft 33 has located upon its outer end, adjacent to a removable cover plate 34, a gear 35. This gear meshes with a gear 36 located fast on the outer end of another shaft 37, said gear being also available when the cover plate 34 is removed. The ratio of the movement of the shaft 33 and the shaft 37 can thus be adjusted within a wide range by providing a series of gears with different numbers of teeth and interchanging them on the ends of the two shafts to suit any particular job.

Fast on the shaft 37 is a gear 38 which meshes with a loose gear 39 on the shaft 33, said gear 39 meshing with the toothed periphery of the ball ratchet gear already mentioned.

Thus the outer periphery of the gear 30 is driven constantly at slow speed, while the sleeve is directly connected to the drive of the machine and moves faster than the said gear 30, which it is free to do because of the ball ratchet. When the direct drive is unclutched the ball ratchet starts to drive the sleeve more slowly through the medium of the balls moving into clamping relation.

By providing means for shifting the disc clutch 25, I am enabled to change the ratio of speed between the shaft 24, on which the drive pulley is located and the jack shaft 18 because the moment the clutch 25 is disengaged from the sleeve 26, the continued movement of the sleeve and the jack shaft 18 is caused by the picking up of its drive by the gear 30 providing one or the other of the gears 19 or 20 on the shaft 18 is in mesh with the gears on the sleeve.

So long as the relationship set up in the additional drive, as last above described, is slower than the direct drive speed of the shaft 24, it is free to revolve without affecting the freedom of the interior of the ball ratchet gear to revolve.

The result of this arrangement will be evident. By the use of suitable automatic equipment timed to operate at a given interval, I am enabled to change work speeds on the splined shaft without any jar or any clashing of gears. The cutting stroke can continue at one speed until the point has been reached when it should become slower, and thereupon it will start to move slower without nicking the work, breaking the tools or setting up any lash in the driving gears.

The arrangement whereby I may change the ratios by taking away one set of gears and substituting another, presents a very decided advantage, because it makes it possible for me in an automatic lathe to make a special prearranged set up of speeds for each job of work, which speeds are subject to automatic shifting to and from each other.

The mechanism for automatically shifting from the one previously set up speed to the other is shown in a number of the views. There is an additional shaft 40, arranged in the supplementary speed change box, which carries a spur gear 41 at its outer end, which spur gear is acted upon by a pair of rack bars 42, 43, slidably held in suitable channels in a wall of the box.

On this shaft 40, are a pair of arms 44 having rollers 45 on the ends thereof.

Figure 9:
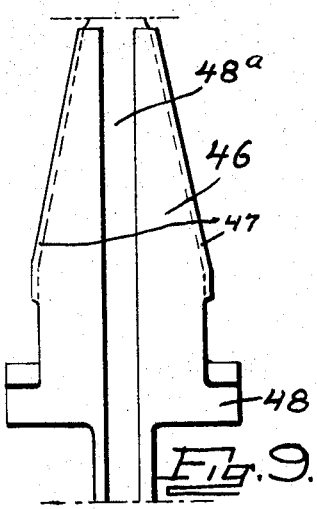
Figure 9 is a diagrammatic plan of the cam for operating the clutch shifter.
Figure 10:
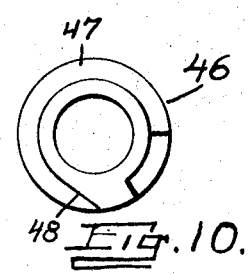
Figure 10 is an end view of the same as it is constructed.
Figure 8:
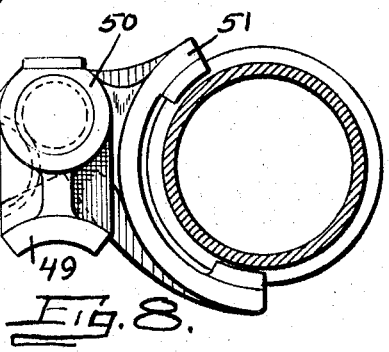
Figure 8 is a view of the high speed clutch shifter.

On the shaft 37 is mounted a loose cam 46, having a shape (see developed cam in Fig. 9) to present two tapered lateral faces 47, terminating in raised portions 48.

When the shaft 40 is rocked in one direction or the other, one or the other of the rollers 45 will be rocked into contact with the cam, and since the cam is constantly rotated by a mechanism to be described, the result will be to force the cam to the left or to the right, dependent upon which arm is rocked over so as to bring its roller into contact.

The cam has a central channel or groove 48a which is in constant engagement with a rib 49 located on a clutch shifting sleeve 50. This sleeve is on the shaft 33, and has a second rib 51 which engages the groove in the collar of the trigger clutch 25.

The result, then, of shifting the cam laterally along the shaft 37, is to move the clutch 25 into position of driving the sleeve 26 or permitting it to remain idle so far as the shaft 24 is concerned.

The cam is driven by means of a gear 52 thereon, which meshes with a pinion 53 journaled in a radial projection on the sleeve 50. This pinion is in mesh with the teeth 54 formed in the shaft 37, and since the cam and the sleeve move together, there will be a constant rotation applied to the cam, because the shaft 37 is revolved constantly during the operation of the machine through gears 31 and 32.

The latching element consists in an arm 54a located on the shaft 40, which has a special shaped dog 55 on its outer end. This dog has cavities 56 at the two ends thereof, and smaller cavities 57 and 58 just to the two sides of the peak between the two main cavities.

There is a spring 59 connected to a latch 60, which latch rides on the segment 55 (Fig. 4).

As so constructed, when the rack bars are moved so as to throw one of the roller arms into cam engagement, the rock shaft 40 will move so as to lift the latch end from which ever of the central half notches or cavities it is then engaging and move it over the peak of the cam. The shaft 40 is free for slight endwise movement and the resultant action between roller 45 and the cam 46 will move the shaft and the segment so that when the latch engages the terminal notch the segment will have moved to line up the latch end with the other half notch, which will be engaged upon the return movement of the rock shaft to neutral.

As the cam revolves the rock shaft will be moved by reason of the roller arm being lifted, as has been described, until the latch rests in the central notch at the same side of the apex as the terminal notch with which engagement was had during the cam movement.

Thus, at the end of each roller arm actuation the rock shaft will be brought back to a neutral position, ready for the next operation, and it is practical to shift the structure as many times as desired during a cycle of operations. This is accomplished by adding and locating the required number of dogs.

The timing discs 9 with the dogs 12 thereon, have been referred to earlier in the description, and it may now be noted that these dogs are arranged to actuate the two rack bars which serve to shift the rock shaft 40 to and fro. It will also be evident that the mechanism for bringing the rock shaft back to a latched neutral position at the end of each operation will bring the rack bars to a neutral position also. The rack bars engage opposite sides of the spur gear which rocks the shaft 40, and as will be noted in Figure 3, the one disc 9 serves for both rack bars, the dogs being set in place so that their contact fingers lie in two planes, one plane being coincident with the position of one of the pair of rack bars.

Another of the discs 9 serves to control the stopping of the work drive by operating the main drive pulley clutch. The third disc operates the rapid traverse clutch control rod, thus stopping the entire mechanism and disconnecting the rapid traverse.

When the operator has set up a piece of work in the machine, and arranged the desired work speeds and the point of time where the various carriage feeding, tool feeding and work and traverse speeds will come into play, he will throw over the lever 67a, which operates the main spindle feed pulley clutch, and also will throw over the rapid traverse lever 71 to start the movement rapidly, at the start.

Figure 3:
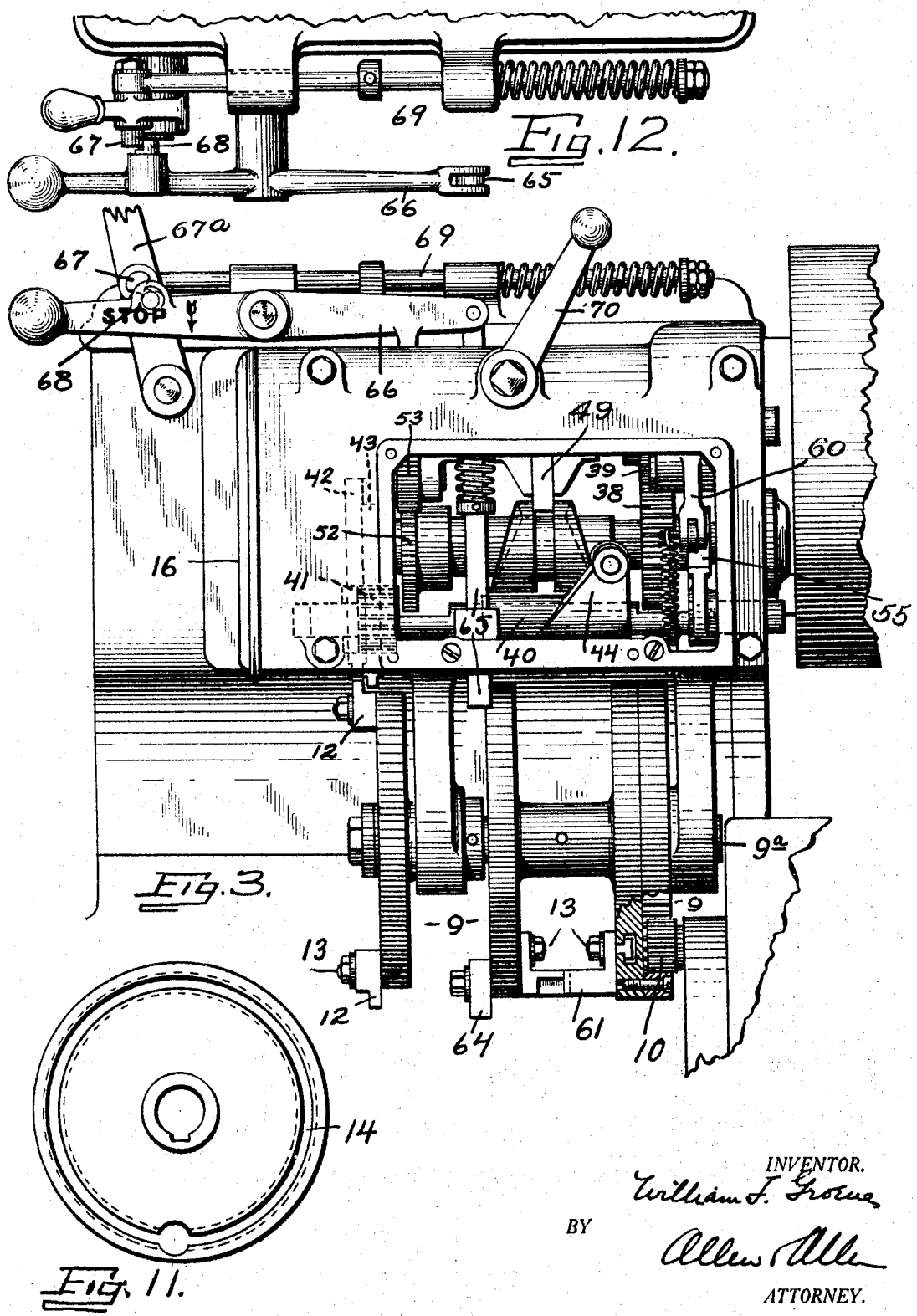
Figure 3 is an enlarged view of the gear change box on the side of the head of the lathe.

As stated at the outset of this description, I have omitted to describe the driving gears and pulleys of the rapid traverse, but it may be noted that the disc 9 which operates the rapid traverse lever 71 operates by thrusting the lever to and from a latched driving or a latched off position. Thus there are dogs 61 which are shown in Figure 3, that strike down a plunger 62, shown in Figure 2, thereby throwing the rapid traverse lever to and fro. An automatic cam mechanism such as has been described may be used also, as in my co-pending application.

The rapid traverse lever 71 is thrown off before the spindle feed trigger clutch comes into operation, and the spindle feed is brought into operation by the automatic mechanism which has been fully described above, at the time that the rapid traverse is released.

The disc 9, which serves to release the work feed clutch at the work feed pulley, has a dog 64 which engages a sliding bar 65, said bar having a spring to hold it downwardly.

The bar 65 is pivoted to a latch lever 66, which is mounted on top of the automatic control box in such a position that when the operator throws over the work feed clutch lever 67a, he causes a latch pin 67 thereon to pass over a second latch pin 68 on the latch lever. These pins are formed of round stock with angle flat faces formed thereon. The latch lever thus tends to hold the work feed clutch lever in one position, which is opposed by a spring bar 69 that is pivoted to this clutch lever.

When the disc 9 bearing the lug 64 thereon strikes up the sliding bar in the automatic feed box, this depresses the engaging end of the latch lever 66, thus releasing the clutch lever, with the result that it is spring pulled to a position that throws off the clutch in the work feed pulley. The work drives or feeds operate in connection with the rapid traverse (only partly shown) as follows:—The operator throws in the spindle clutch levers 67a which also puts the tool feeding shaft into operation. He also throws the rapid traverse lever 71. The tools are rapidly advanced to the work and then an automatic mechanism (not shown) will throw out the rapid traverse. The work speed feed then picks up the operation and finishes the work shifting from one work speed to another, as has been described herein. Thereupon the automatic mechanism operates to throw off the work feed for the tools and the spindle drive. The operator then throws the rapid traverse lever 71 whereupon the tools retract and the tool carriage returns to starting position all on rapid traverse and then the rapid traverse is thrown.

I have shown a lever 70 which is used to shift the change speed gears on the jack shaft, which will not require special description.

Having thus described my invention, what I claim as new and desire to cover by Letters Patent, is:—

1. In a machine comprising a rotatable work holder, a driving shaft, at least three gears rotatable on said driving shaft, one gear being capable of rotation relatively to the others, a ratchet limiting said relative rotation to one direction, a clutch by which said other gears are connectible to or disconnectible from said driving shaft, means whereby said machine operatively actuates said clutch, a change-speed operative connection from said one gear to said driving shaft, a jack shaft, gears with which said jack shaft rotates, adapted to be alternatively meshed with said other gears, and a change-speed operative connection from said jack shaft to said work holder.

2. In a machine comprising a rotatable work holder, a driving shaft, at least two gears rotatable on said driving shaft, one gear being capable of rotation relatively to the other, a ratchet limiting said relative rotation to one direction, a clutch by which said other gear is connectible to or disconnectible from said driving shaft, an operative connection from said other gear to said work holder, two intermediate shafts, meshing gears fixed respectively on the driving shaft and one intermediate shaft, meshing gears fixed respectively on said intermediate shafts, a second pair of meshing gears, one fixed on the second intermediate shaft, and the other rotatable on the one intermediate shaft and meshing with the ratchet-limited gear on the driving shaft, a member slidable on the one intermediate shaft, operatively engaging said clutch, a cam rotatable and slidable on the second intermediate shaft, operatively engaging said member, teeth on said one intermediate shaft, gearing meshed with said teeth and rotating said cam, rocking elements, said cam having inclined surfaces alternatively engageable by one or the other rocked element to be slid one way or the other, according to which rocking element is engaged, rotatable dogs, means whereby said dogs rock one or the other element into engaging position, and means whereby said machine rotates said dogs.

3. A machine as set forth in claim 2 in which the meshing gears fixed respectively on the intermediate shafts are removable for replacement by gears of a different ratio.

4. A machine as set forth in claim 2 in which the operative connection to the work holder includes meshing gears removable for replacement by gears of a different ratio.

5. A machine as set forth in claim 2 in which certain meshing pairs of gears are removable for replacement by gears of a different ratio, one of said pairs being the gears fixed respectively on the intermediate shafts and another of said pairs being included in the operative connection from the driving shaft to the work holder.

WILLIAM F. GROENE.